(12) United States Patent
Hirano

(10) Patent No.: US 7,481,484 B2
(45) Date of Patent: Jan. 27, 2009

(54) PEDESTRIAN PROTECTION APPARATUS FOR VEHICLE

(75) Inventor: Katsuhisa Hirano, Toyota (JP)

(73) Assignee: Kojima Press Industry Co., Ltd., Toyota-shi (JP)

( * ) Notice: Subject to any disclaimer, the term of this patent is extended or adjusted under 35 U.S.C. 154(b) by 0 days.

(21) Appl. No.: 11/949,195

(22) Filed: Dec. 3, 2007

(65) Prior Publication Data

US 2008/0169661 A1 Jul. 17, 2008

(30) Foreign Application Priority Data

Jan. 12, 2007 (JP) ............................. 2007-003962

(51) Int. Cl.
*B60R 19/02* (2006.01)
(52) U.S. Cl. .............................. 296/187.04; 296/180.1; 293/102; 180/68.4
(58) Field of Classification Search ............ 296/187.04, 296/187.09, 180.1; 293/102, 120; 180/274, 180/68.1
See application file for complete search history.

(56) References Cited

U.S. PATENT DOCUMENTS

| | | | | |
|---|---|---|---|---|
| 5,526,872 | A * | 6/1996 | Gielda et al. ................... | 165/41 |
| 6,467,822 | B1 | 10/2002 | Leng | |
| 6,513,843 | B1 | 2/2003 | Frederick et al. | |
| 6,540,275 | B1 * | 4/2003 | Iwamoto et al. ............... | 293/24 |
| 6,755,459 | B2 * | 6/2004 | Thelen et al. .......... | 296/187.04 |
| 6,893,064 | B2 * | 5/2005 | Satou ......................... | 293/132 |
| 7,013,951 | B2 * | 3/2006 | Bauer et al. ................... | 165/41 |
| 7,325,861 | B2 | 2/2008 | Zacheiss et al. | |
| 2004/0238256 | A1 * | 12/2004 | Henderson et al. .......... | 180/274 |
| 2005/0280268 | A1 * | 12/2005 | Dehn et al. .................. | 293/120 |
| 2007/0046043 | A1 * | 3/2007 | Ito .............................. | 293/120 |
| 2007/0085356 | A1 * | 4/2007 | Itou et al. .................... | 293/120 |
| 2007/0182171 | A1 * | 8/2007 | Kageyama et al. .......... | 293/102 |
| 2007/0182172 | A1 * | 8/2007 | Hasegawa .................... | 293/102 |
| 2007/0284915 | A1 * | 12/2007 | Hasegawa et al. ...... | 296/187.04 |
| 2008/0001433 | A1 * | 1/2008 | Noyori et al. .......... | 296/187.04 |
| 2008/0093868 | A1 * | 4/2008 | Steller ........................ | 293/142 |
| 2008/0217959 | A1 * | 9/2008 | Noyori et al. .......... | 296/187.04 |

FOREIGN PATENT DOCUMENTS

| | | |
|---|---|---|
| EP | 1 072 476 A2 | 1/2001 |
| EP | 1 241 080 A2 | 9/2002 |
| JP | 08-276867 A1 | 10/1996 |
| JP | 2004-203158 A1 | 7/2004 |
| JP | 2004-203183 A1 | 7/2004 |
| WO | 2005/056344 A1 | 6/2005 |

\* cited by examiner

*Primary Examiner*—Jason S Morrow
(74) *Attorney, Agent, or Firm*—Burr & Brown

(57) ABSTRACT

A pedestrian protection apparatus for a vehicle including a plate member which is disposed at a lower part of a front of the vehicle so as to extend in a frontward and backward direction of the vehicle. The plate member has a concave portion which is open at the upper surface of the plate member and which is formed in the plate member so as to be positioned more frontward of the vehicle than a radiator. The concave portion includes a non-horizontal bottom portion which provides a non-horizontal inner surface extending in an inclined or curved manner such that a depth thereof is gradually increased toward a rear side of the vehicle, and an outlet hole which is disposed at the concave portion so as to be positioned more rearward of the vehicle than the non-horizontal inner surface.

7 Claims, 6 Drawing Sheets

PEDESTRIAN PROTECTION APPARATUS FOR VEHICLE

The present application is based on Japanese Patent Application No. 2007-003962 filed on Jan. 12, 2007, the contents of which are incorporated herein by reference.

BACKGROUND OF THE INVENTION

1. Field of the Invention

The present invention relates to a pedestrian protection apparatus for a vehicle, and in particular to an improved structure of the pedestrian protection apparatus for a vehicle installed at a lower part of a front section of the vehicle and arranged to sweep a leg portion of a pedestrian that has collided with or contacted a front face of the vehicle, thereby protecting the leg portion of the pedestrian.

2. Description of the Related Art

In vehicles such as automobiles, there are conventionally disposed, at a front face, a rear face, or side faces, of the vehicle, various types of protection apparatus which absorb impact energy generated upon a collision for protecting the vehicle body and passengers. In recent years, there is disposed, at the front face of the vehicle, an apparatus for protecting a pedestrian upon a collision or contact of the pedestrian with the front face of the vehicle.

As one type of the pedestrian protection apparatus, there is known a so-called leg-sweep apparatus which includes a plate member fixed at a lower part of the front section of a vehicle in a state of being arranged to extend in a frontward and backward direction of the vehicle. A front end portion of the plate member is arranged to come into contact with a leg portion of a pedestrian that is collided with the front face of a vehicle and sweep (scoop up) the leg portion of the pedestrian, thereby causing the pedestrian to fall down toward the vehicle. Thus, it is possible to advantageously limit a knee-bending angle in an abnormal direction upon the contact of the pedestrian with the vehicle, so that the occurrence of injuries such as a knee fracture can be minimized, thereby assuring protection and safety of the pedestrian. (See, JP-A-2004-203183, for example.)

The pedestrian protection apparatus (leg sweep apparatus) structured as above has an advantage in that the entire apparatus including the plate member can be easily integrally molded with an excellent formability by molding operation or the like using a synthetic resin material, for example. However, in an attempt to further improve the pedestrian protection apparatus, the inventors of the present invention examined the structure of the pedestrian protection apparatus having the foregoing features from various aspects and found that the known pedestrian protection apparatus has following drawbacks.

Specifically, in the above known pedestrian protection apparatus, the plate member is generally disposed at the lower part of the front section of the vehicle so as to extend continuously over the entire width of a vehicle width such that the plate covers the substantially entire surface of the lower part thereof. Thereby, the pedestrian protection function can be securely exhibited even if the pedestrian comes into contact with any part of the front face of the vehicle. Thus, in the plate member, there is formed an outlet hole penetrating therethrough in a plate thickness direction, so as to discharge a foreign substance such as water, mud, gravel or a pebble entered through a gap between the plate member and the vehicle (vehicle body) to the outside. Due to the mechanism, during traveling of the vehicle, a part of air flowing from a frontward to a rearward of the vehicle on an upper surface side of the plate member is released at a furious speed from the outlet hole to a lower surface side of the plate member in a vertically downward direction. It was found that this causes a problem of disturbing a horizontal airflow under the vehicle, and resulting in an increase of air resistance of the vehicle.

On the other hand, in conventional vehicles such as an automobile, there is generally disposed an undercover for covering an engine room or the like from an underside thereof. The undercover includes a cooling air outlet for releasing air taken into an engine room as a cooling air for a radiator, where the cooling air outlet is formed so as to penetrate through the plate in the thickness direction thereof. Such an undercover can also cause the problem of increasing an air resistance due to the mutual interference between air released from the cooling air outlet in the vertically downward direction and air flowing under the vehicle toward the rear of the vehicle during traveling of the vehicle under the state where the undercover is installed therein. Consequently, there has been proposed a technology in which a large opening portion open toward the rear of the vehicle is provided between a floor panel or the like and the undercover to release the air inside the engine room toward the rear of the vehicle therethrough, thereby preventing the disturbance of an air flowing under the vehicle (e.g. See JP-A-08-276867).

Then, it is conceivable that the technology for reducing the air resistance of the undercover can be applied to the known pedestrian protection apparatus for a vehicle having the foregoing internal problems, that is, the large opening portion open toward the rear of the vehicle can be provided between the plate member and an opposed member thereof, in addition to the outlet hole. The ordinary pedestrian protection apparatus, however, is installed at a more frontward position than a position of the radiator disposed in the front section of the vehicle. Thus, when the above technology is applied as it is, a large amount of cooling air is allowed to flow from the opening portion positioned more frontward than the radiator to the outside. This results in a new problem of deterioration of a cooling performance of the radiator due to a shortage in the ventilation amount of cooling air flowing toward the radiator.

Meanwhile, in the front section of the vehicle, when the plate member is disposed so as to extend astride the radiator in the frontward and backward direction of the vehicle and the outlet hole is formed in a portion of the plate member located immediately below the radiator or located more rearward in the vehicle than the radiator, the foregoing proposed technology can be applied to the pedestrian protection apparatus with a sufficient amount of ventilation to the radiator secured. However, then in turn, the force of air released downwardly from the outlet hole increases, which causes a concern about a more significant increase in the air resistance under the vehicle.

SUMMARY OF THE INVENTION

The present invention was made in the light of the above-described situations. It is an object of the invention to provide an improved structure of a pedestrian protection apparatus for a vehicle, in which a plate member is disposed at a lower part of a front section of the vehicle so as to extend in a frontward and backward direction thereof and an outlet hole is formed in the plate member for discharging a foreign substance entered an upper surface side of the plate member to the outside, thereby preventing or suppressing an increase of air resistance in the vehicle to the maximum extent possible which occurs when air horizontally flowing under the vehicle is disturbed by air released from the outlet hole of the plate member to a lower surface thereof during traveling of the vehicle.

The above-indicated object of the present invention may be attained according to a principle of the invention, which provides a pedestrian protection apparatus for a vehicle comprising: a plate member which is disposed at a lower part of a front of the vehicle so as to extend in a frontward and backward direction of the vehicle and which is provided with an outlet hole discharging a foreign substance entered an upper surface side of the plate member to the outside in a state in which the plate member is fixed to the vehicle, the apparatus being arranged to sweep a leg portion of a pedestrian that has collided with the front of the vehicle by contact of a front end of the plate member with the leg portion of the pedestrian, thereby protecting the leg portion of the pedestrian, wherein the plate member comprises a concave portion which is open at the upper surface of the plate member and which is formed in the plate member so as to be positioned more frontward of the vehicle than a radiator disposed at the front section of the vehicle in a state in which the plate member is fixed to the vehicle, and wherein the concave portion includes a non-horizontal bottom portion which provides a non-horizontal inner surface extending in an inclined or curved manner such that a depth thereof is gradually increased toward a rear side of the vehicle and the outlet hole formed by a communicating hole which is disposed at the concave portion so as to be positioned more rearward of the vehicle than the non-horizontal bottom portion and which allows to communicate inside and outside of the concave portion.

In a preferable form of the apparatus according to the present invention, the concave portion further includes a horizontal bottom portion formed integrally with the non-horizontal bottom portion, the horizontal bottom portion providing a horizontal inner surface extending continuously and horizontally from a rear-side edge of the non-horizontal bottom portion toward the rear of the vehicle, and wherein the outlet hole is disposed at the concave portion so as to be positioned more rearward of the vehicle than the horizontal inner surface provided by the horizontal inner portion of the concave portion.

In another preferred form of the present invention, the plate member further includes an overlapping portion that overlaps with the horizontal inner surface of the concave portion, and wherein an inner space portion of the concave portion located between the horizontal inner surface and a lower surface of the overlapping portion is surrounded by a tubular inner circumferential surface extending horizontally in the frontward and backward direction of the vehicle.

In another preferred form of the present invention, the concave portion further includes two sidewalls provided downwardly and integrally with a lower surface of the plate member in a state in which the sidewalls extend straightly in the frontward and backward direction of the vehicle.

In another preferred form of the present invention, wherein the concave portion have an angular U-shaped cross-section which is taken along the plane perpendicular to the frontward and backward direction of the vehicle and which is open upward.

In another preferred form of the present invention, a plurality of the outlet holes are provided in the plate member.

During traveling of the vehicle in which the foregoing pedestrian protection apparatus for the vehicle having the structure according to the present invention is installed at the lower part of the front section thereof, among air flowing from the frontward of the vehicle to the rearward thereof on the upper surface of the plate member, the air to be released from the outlet hole to the lower surface of the plate member is guided to the non-horizontal inner surface at a relatively moderate speed, for example as compared to air released from the outlet hole formed at a portion of the plate member positioned immediately below the radiator or positioned more rearward than that, and the air is released in the rearward direction of the vehicle. Moreover, the ventilation amount of cooling air flowing toward the radiator can also be sufficiently secured.

Therefore, using the pedestrian protection apparatus for vehicle according to the present invention described above can maximally prevent or suppress an increase of air resistance occurring in the vehicle when airflow flowing horizontally under the vehicle is disturbed by air released from the outlet hole of the plate member to the lower surface side thereof during traveling of the vehicle, without deteriorating the cooling mechanism for the radiator. Thereby, air resistance in the vehicle can be significantly effectively reduced. As a result, traveling stability and fuel consumption in the vehicle can be both advantageously improved.

DETAILED DESCRIPTION OF THE PREFERRED EMBODIMENTS

To further clarify the present invention, there will be described in detail embodiments of the present invention with reference to the accompanying drawings.

Figure 1:
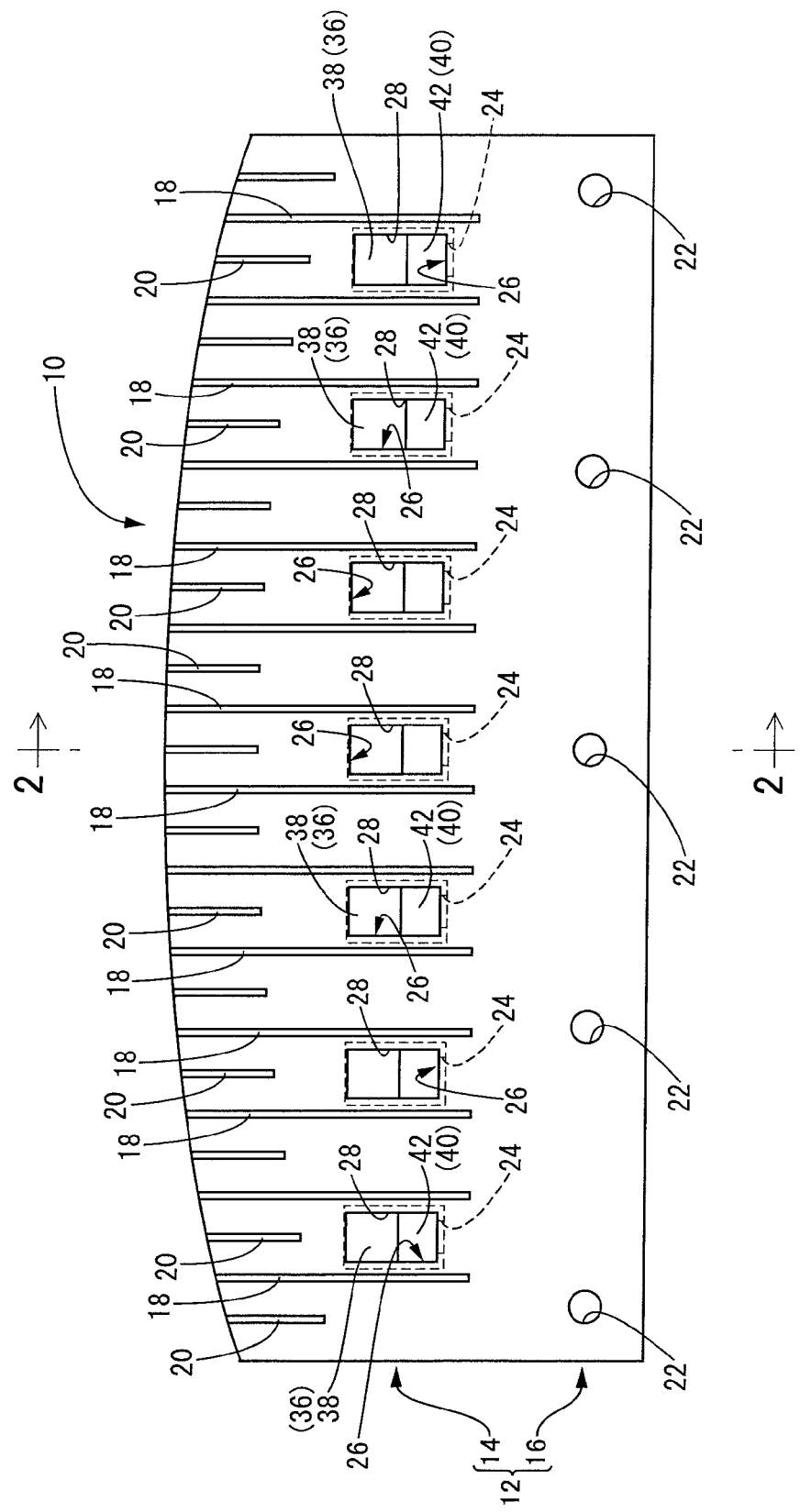
FIG. 1 is a top plan view showing an example of a pedestrian protection apparatus constructed according to a first embodiment of the invention.
Figure 2:
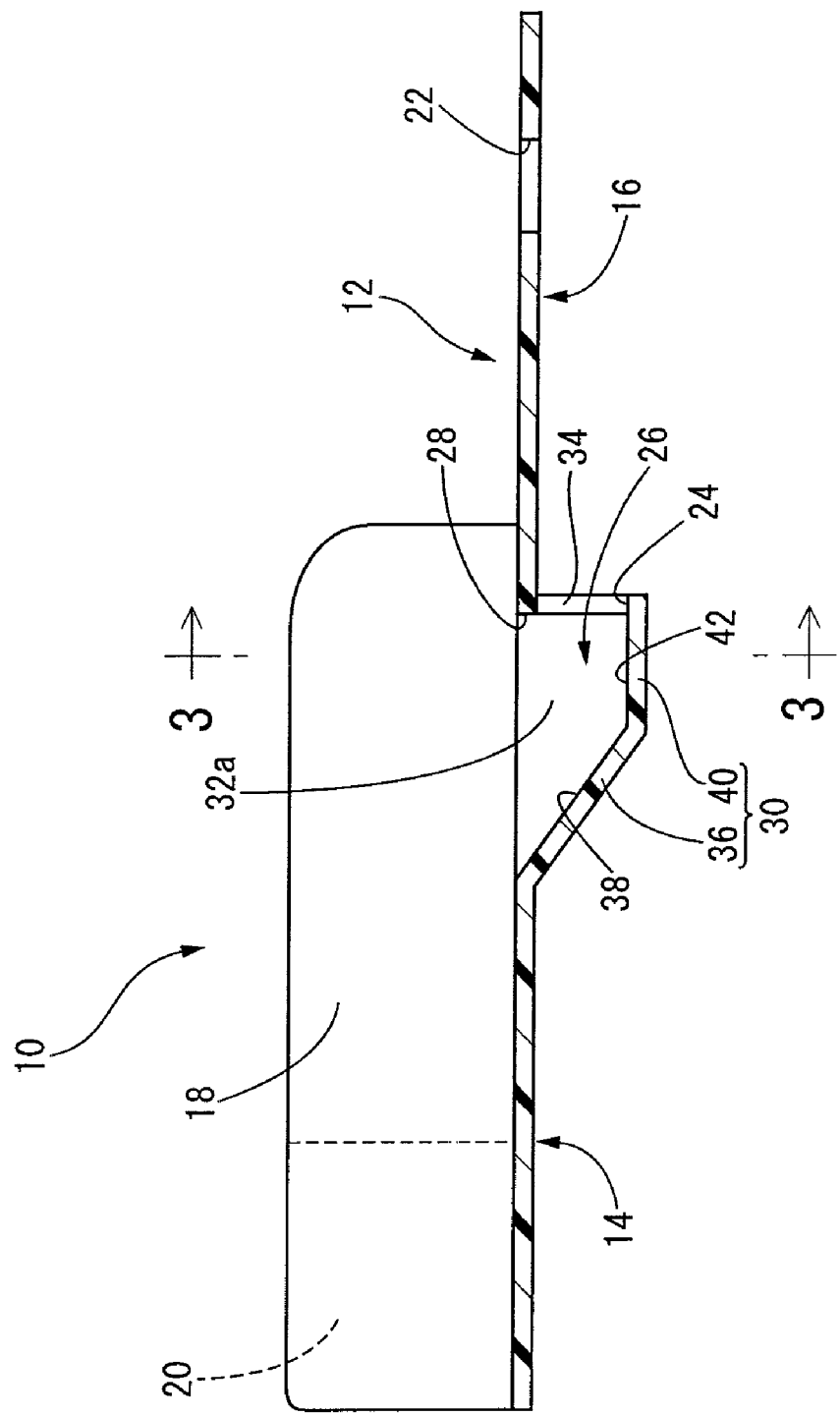
FIG. 2 is a cross-sectional view taken along line 2-2 of FIG. 1.
Figure 3:
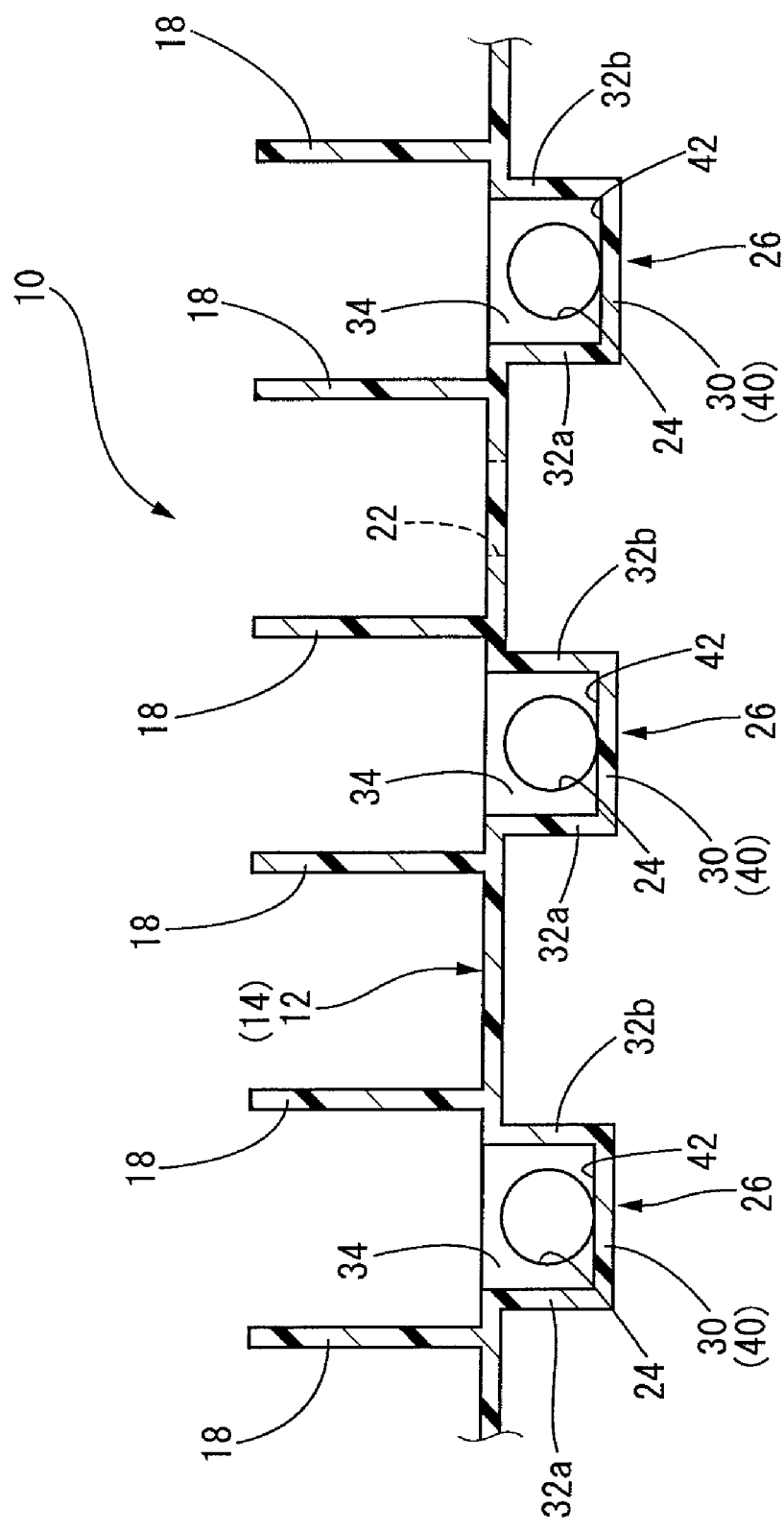
FIG. 3 is a partially enlarged cross-sectional view taken along line 3-3 of FIG. 2.

Referring first to FIGS. 1 to 3, there will be explained a leg sweep apparatus as a pedestrian protection apparatus for a vehicle according to a first embodiment of the present invention installed inside of a front bumper which is disposed at a front face side of an automotive vehicle. FIG. 1 shows a top plan view and FIGS. 2 and 3 show two vertical cross sections different in cutting directions. As obvious in those figures, the leg sweep apparatus 10 according to the present embodiment includes a base plate 12 as a plate member.

The base plate 12 is formed of a synthetic resin material such as polypropylene or ABS resin and is constituted by a thin planar plate having a generally rectangular shape. In the base plate 12, the dimension as measured in a direction extending in a lateral direction in FIG. 1, i.e., the dimension as measured in a vehicle width direction or a lateral direction of the vehicle (hereinafter, referred to as the "lateral direction") under installation of the leg-sweep apparatus 10 in the vehicle, is made smaller than the vehicle width by a predetermined amount, and the dimension as measured in a direction extending in an upward and downward direction in FIG. 1, i.e., the dimension as measured in a vehicle length or a frontward and backward direction of the vehicle (hereinafter, referred to as the "frontward and backward direction), is made sufficiently smaller than the above-indicated dimension as measured in the lateral direction.

In the base plate 12 formed as above, a region occupying a substantially front half thereof is referred to as a frontward region 14, whereas a substantially rear half of the plate member except for the frontward region 14 is referred to as a rearward region 16. On an upper surface of the frontward region 14 of the base plate 12, there are formed integrally and upwardly a plurality of first reinforcing ribs 18 (here, 14 first reinforcing ribs) each having a thin planar shape and extending straightly and continuously with a constant height over an entire length of the frontward region 14 from its front end to its rear end. In addition, the first reinforcing ribs 18 are arranged in parallel with a constant distance therebetween in the lateral direction.

At a distal end portion (front end portion) of the upper surface of the frontward region 14, a plurality of second reinforcing ribs 20 (here, 15 second reinforcing ribs) are arranged parallel to each other. The second reinforcing ribs 20 have a thin planer shape having the same thickness and height as those of the first reinforcing ribs 18 and having a shorter length than the first reinforcing ribs 18. Between any adjacent two first reinforcing ribs 18, each of the second reinforcing ribs 20 are integrally formed upwardly so as to extend straightly and continuously in the frontward and backward direction. Additionally, the second reinforcing ribs 20 are arranged parallel to adjacent first reinforcing ribs 18, and also the adjacent second reinforcing ribs 20 having the first reinforcing rib 18 therebetween are arranged parallel to each other.

The rearward region 16 of the base plate 12 is made as a flat surface where an upper and a lower surfaces thereof do not include first and second reinforcing ribs 18, 20 and the like. At a rear side-end portion of the rearward region 16 formed as the flat surface, a plurality of insertion holes 22 (here, 5 insertion holes) are formed with a predetermined distance between each other in the lateral direction. Through each of the insertion holes 22, a fixing bolt can be inserted to fix the base plate 12 (leg sweep apparatus 10) at a lower part of a front section of the vehicle (vehicle body), specifically, at a radiator support supporting a radiator (See FIG. 4) which is disposed at the lower part of the front section of the vehicle.

Thus, in the present embodiment, as will be described below, the leg sweep apparatus 10 is configured to be installable in such a manner that the rearward region 16 of the base plate 12 is horizontally arranged at a predetermined place of the vehicle (See FIG. 4). The frontward region 14 of the base plate 12 having the large number of first and the second reinforcing ribs 18, 20 disposed thereon is formed so as to have a sufficiently large rigidity against a bending load, that is, sufficient deformation resistance to an impact load applied in the frontward and backward direction in the state of being installed in the vehicle, as compared to the rearward region 16 having no ribs. Moreover, in the frontward region 14 formed as above, the distal end portion, where front side portions of the first reinforcing ribs 18 and the second reinforcing ribs 20 are both disposed, is formed to have a larger rigidity than the other portions.

In the above leg sweep apparatus 10 according to the present embodiment, particularly, in a more rearward position than the second reinforcing rib 20 formed between the adjacent first reinforcing ribs 18 on the frontward region 14 of the base plate 12, there is formed an outlet hole 24 having a special structure which is not provided in known apparatuses of this kind. In a state in which the leg sweep apparatus 10 is fixed to the lower part of the front section of the vehicle, the outlet hole 24 serves as a hole which discharges a foreign substance, such as water, dirt, gravel or pebbles entered the upper surface side of the base plate 12 through a gap between the base plate 12 and the front bumper or the vehicle body, to a lower surface side of the base plate 12.

As apparent from FIG. 1, in the present embodiment, in the region posterior to alternate second reinforcing ribs 20 in the frontward region 14 of the base plate 12, there is formed each concave portion 26 that has a longitudinal rectangular shape in which the frontward and backward direction of the base plate 12 is longitudinal and that includes an opening portion 28 opening at the upper surface of the base plate 12. In other words, a plurality of the concave portion 26 is disposed at an intermediate position in the frontward and backward direction of the frontward region 14 of the base plate 12 such that they are dispersedly positioned with a distance between each other in the lateral direction.

Furthermore, as shown in FIGS. 1 to 3, each of a plurality of the concave portion 26 disposed on the frontward region 14 of the base plate 12 includes a bottom wall portion 30 and three sidewall portions comprised of two longitudinal wall portions 32a, 32b and a lateral wall portion 34. The bottom wall portion 30 has a longitudinal rectangular planar shape as a whole with the same thickness as that of the base plate 12 and is formed so as to integrally extend from a front side marginal edge of four marginal edges toward the rear side. The four marginal edges are positioned at front, rear, right and left sides of the opening portion 28 of the concave portion 26 in the base plate 12.

In the bottom wall portion 30, a portion positioned more frontward than an approximately center part in the longitudinal direction (extending direction) is formed as an inclined bottom portion 36 which inclines downwardly toward the rear side. Additionally, an inner face (upper surface) of the inclined bottom portion 36 is referred to as an inclined inner surface 38, which is a non-horizontal inner surface comprised of an inclined flat surface inclining downwardly and extending integrally from the front side marginal edge of the opening portion 28 such that a depth thereof is gradually increased toward the rear side. Furthermore, a portion positioned more rearward than the inclined bottom portion 36 is referred to as a horizontal bottom portion 40 which extends horizontally in a frontward and backward direction. The inner face (upper surface) of the horizontal bottom portion 40 is referred to as a horizontal inner surface 42 comprised of a flat surface, which extends integrally from a rear edge of the inclined inner surface 38 horizontally and continuously toward the rear side.

Meanwhile, each of the two longitudinal wall portions 32a, 32b has a vertically long trapezoidal planar shape as a whole, with the same thickness as that of the base plate 12, including a leg and a bottom extending along the inclined inner surface 38 and the horizontal inner surface 42 of the bottom wall portion 30. Additionally, an upper base of each longitudinal wall portion 32 having the trapezoidal planar shape is longer than the lower base thereof and the other leg thereof extends perpendicularly to the upper and lower bases.

The two longitudinal wall portions 32a, 32b configured as above are formed such that each of them extends integrally from two marginal edges positioned on both sides in the lateral direction of the four marginal edges of the opening portion 28 of the concave portion 26 in a vertically downward direction. In other words, the two longitudinal wall portions 32a, 32b are opposed to each other in the lateral direction and are provided integrally and downwardly with the lower surface of the frontward region 14 of the base plate 12 so as to extend straightly in the frontward and backward direction along the bottom wall portion 30. Furthermore, lower distal edge portions of the two longitudinal wall portions 32a, 32b are integrated with both-side distal edges in the right and left sides of the bottom wall portion 30 (both-side distal edges in the width direction).

In this embodiment, the arrangement of the longitudinal wall portion 32 included in each of a plurality of the concave portion 26 on the lower surface of the frontward region 14 of the base plate 12 is similar to the arrangement of the first and the second reinforcing ribs 18, 20 on the upper surface of the frontward region 14 of the base plate 12. Thereby, each longitudinal wall portion 32 can exhibit a function as a reinforcing rib provided on the lower surface of the frontward region 14 of the base plate 12.

Moreover, the lower distal edge of each longitudinal wall portion 32 is integrated with the both-side distal edges in the width direction of the bottom wall portion 30. Thereby, a cross-section of each concave portion 26 in the lateral direction of the base plate 12 (the vehicle width direction under installation of the leg-sweep apparatus 10 in the vehicle) have an angular U-shape which is open upwardly. In this manner, the concave portion 26 is formed to be able to exhibit a function as a reinforcing bead straightly extending in the frontward and backward direction of the base plate 12. As the results, rigidity against a bending load applied on the frontward region 14 of the base plate 12 having a plurality of the concave portion 12 is more advantageously made larger, whereby further improving deformation resistance to an impact load applied to the base plate 12 in the frontward and backward direction.

The lateral wall portion 34, as a whole, has a laterally long rectangular planar configuration having the same thickness as that of the base plate 12. The lateral wall portion 34 are formed so as to extend integrally from a marginal edge positioned on the rear side of the four marginal edges of the opening portion 28 of the concave portion 26 in the vertically downward direction. In other words, the lateral wall portion 34 is provided downwardly and integrally with the lower surface of the frontward region 14 of the base plate 12 and extends in the lateral direction on the rear end side of each of the two longitudinal wall portions 32a, 32b and the bottom wall portion 30, in a state in which the lateral wall portion 34 closes a rear-side opening portion formed by being surrounded by the three wall portions.

At a middle of the lateral wall portion 34 configured as above, there is formed a round outlet hole 24. The outlet hole 24 penetrates through the lateral wall portion 34 in a plate thickness direction so as to communicate the inner space of the concave portion 26 with the outside. In an inner surface of the lateral wall portion 34, the outlet hole 24 is open to the front side of the base plate 12, whereas, in an outer surface of the lateral wall portion 34, the outlet hole 24 opens to the rear side of the base plate 12. Thereby, in the present embodiment, the outlet hole 24 is formed more rearward than the inclined inner surface 38 and the horizontal inner surface 42 of the bottom wall portion 30 of the concave portion 26 in the frontward region 14 of the base plate 12, in the number equivalent to a plurality of the concave portion 26, so as to be dispersedly positioned with a distance between each other in the lateral direction.

As described above, a plurality of the concave portions 26 each having the outlet hole 24 are provided on the frontward region 14 positioned more frontward than the region where the insertion holes 22 for inserting the fixing bolts fixed to the radiator support are formed on the base plate 12. Then, the positions on the base plate 12, where each concave portion 26 are formed as well as each outlet hole 24 formed therein, are set to be more frontward than that of the radiator in a state in which the base plate 12 (leg sweep apparatus 10) is disposed on the lower part of the front section of the vehicle.

Figure 4:
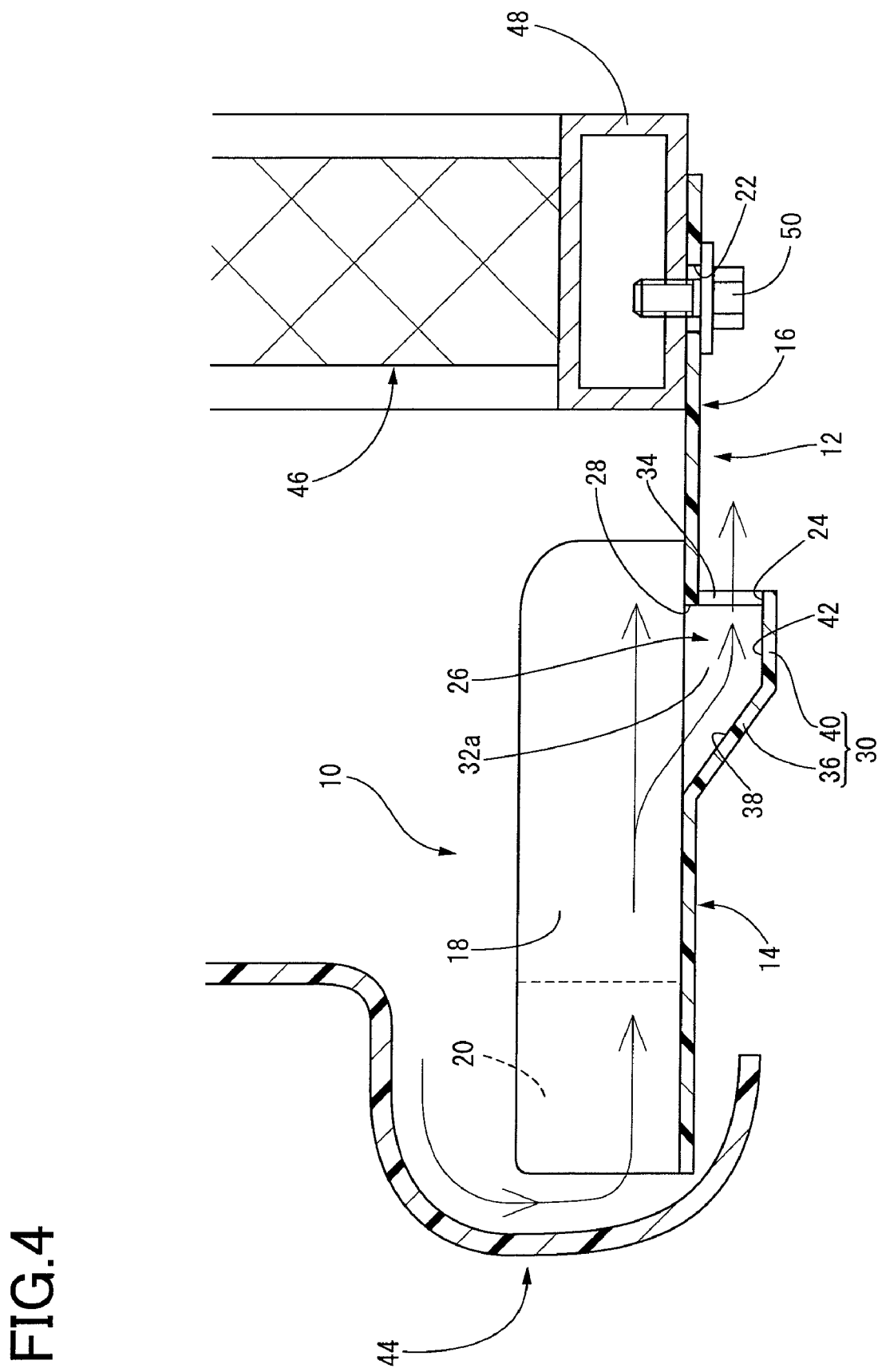
FIG. 4 is an explanatory view showing a state in which the pedestrian protection apparatus of FIG. 1 is installed in a vehicle.

In the leg sweep apparatus 10 structured as above as shown in FIG. 4, for example, in the lower part of the front section of the vehicle body, the base plate 12 is arranged so as to extend horizontally in the frontward and backward direction from the inside of the front bumper 44 to the lower side of the radiator support 48 supporting the radiator 46, where the frontward region 14 of the base plate 12 is arranged to be positioned on the front bumper 44 side. Under the above arrangement, the base plate 12 is fixed to the radiator support 48 by the fixing bolt 50 inserted into each of a plurality of the insertion holes 22 formed on the rearward region 16 of the base plate 12, whereby the leg sweep apparatus 10 is installed at the lower part of the front section of the vehicle.

In this manner, in the leg sweep apparatus 10 according to the present embodiment, when a pedestrian collides or contacts with the front face of a vehicle, the front end of the base plate 12 comes into contact with the lower part of a leg portion of the pedestrian via the front bumper 44, although it is not shown in FIG. 4. The leg sweep apparatus 10 sweeps or scoops up the leg portion of the pedestrian, thereby causing the pedestrian to fall down toward a bonnet of the vehicle. Thus, this reduces damage to the lower part of the leg portion of the pedestrian, and it is possible to minimize the occurrence of injuries to the leg portion of the pedestrian such as bone fractures, thereby assuring protection and safety of the pedestrian.

Additionally, in the leg sweep apparatus 10, the frontward region 14 of the base plate 12 includes the first and the second reinforcing ribs 18, 20 and the longitudinal wall portions 32 exhibiting the same function as those of the reinforcing ribs, as well as the concave portion 26 exhibiting a function of reinforcing beads as a whole, so that the frontward region 14 of the base plate 12 structured as above has an increased deformation resistance. Accordingly, under installation of the apparatus in the vehicle as above, when the frontward region of the base plate 12 comes into contact with the leg portion of the pedestrian, the frontward region 14 of the base plate 12 is effectively prevented from being easily subjected to bending and flexing deformation. Consequently, an impact load in a load characteristic is allowed to rise promptly and reach a target value quickly, whereby efficiently ensuring excellent impact performance that enables a sufficient counterforce to be instantaneously exhibited with respect to impact load.

In the leg sweep apparatus 10 according to the present embodiment, particularly, as indicated by arrows in FIG. 4, during traveling of the vehicle with the apparatus 10 installed at the lower part of the vehicle body, a part of air flowing horizontally from the front side of the vehicle body toward the rear side thereof on the upper surface side of the base plate 12 enters a plurality of the concave portion 26 formed on the lower surface of the frontward region 14 of the base plate 12. Then, the air flown into each of the concave portions 26 is guided by the bottom wall portion 30 composed of the inclined inner surface 38 and the horizontal inner surface 42 extending continuously from the inclined inner surface 38, whereby the direction of air flowing in the vertically downward direction immediately after flown into each concave portion 26 is changed to the horizontal direction toward the rear side. While the air keep flowing in the direction described above, the air is released to the lower surface side of the base plate 12 through the outlet hole 24 formed in the lateral wall portion 34. That is, in this case, the inclined inner surface 38 and the horizontal inner surface 42 are formed as air guiding portions, which change the direction of a part of the air horizontally flowing from the front side of the vehicle body toward the rear side thereof on the upper surface side of the base plate 12 to the direction toward the rear side of the vehicle body (vehicle) and then guide the air into the outlet hole 24. In particular, the inclined inner surface 38 as the non-horizontal inner surface is formed as a front side air guiding portion which is positioned more frontward than the horizontal inner surface 42, whereas the horizontal inner surface 42 is formed as a rear side air guiding portion which is positioned more rearward than the inclined inner surface 38.

Furthermore, under installation of the above leg sweep apparatus 10 at the lower part of the vehicle body, the outlet hole 24 formed in each concave portion 26 is arranged more frontward than the position of the radiator 46. Thus, the speed of air released from the outlet hole 24 can be advantageously reduced, for example, as compared to the arrangement where the outlet hole 24 is formed in the base plate 12 in such a manner that the outlet hole 24 is positioned immediately below the radiator 46 or positioned more rearward than the radiator 46.

Additionally, in the present embodiment, a plurality of the outlet holes 24 serving as nozzles for releasing air flowing on the upper surface side of the base plate 12 are formed to be dispersedly positioned on the frontward region 14 of the base plate 12 such that the outlet holes 24 are spaced apart from each other in the lateral direction. Accordingly, for example, under installation of the apparatus 10 at the lower part of the vehicle body, unlike the conventional apparatus in which the large opening portion open rearwardly is formed between the rearward region 16 of the base plate 12 and a region opposing thereto to release the air flowing on the upper surface side of the base plate 12 rearwardly therethrough, the air flowing the upper surface of the base plate 12 can be released rearwardly through each of the outlet holes 24 positioned more frontward than the radiator 46 with the outlet holes allowed to be relatively small but still enough size to discharge foreign substances such as small stones or gravels from the upper surface side of the base plate 12 to the outside. Consequently, the above-described manner can secure the sufficient amount of cooling air flowing toward the radiator 46 on the upper surface of the base plate 12, although a plurality of the outlet holes 24 are formed to be positioned more frontward than the radiator 46.

Therefore, in the above leg sweep apparatus 10 according to the present embodiment, during the traveling of the vehicle under installation of the apparatus 10 at the lower part of the front section of the vehicle body, it is possible to prevent or minimize an increase of air resistance, which is caused when airflow flowing horizontally under the vehicle body is disturbed by the air released from the outlet holes 24 of the base plate 12 to the lower surface side of the base plate 12, without deteriorating the cooling performance of the radiator 46. Consequently, vehicle traveling stability and fuel consumption can be both advantageously improved.

Additionally, in the above leg sweep apparatus 10, the bottom wall portion 30 of concave portion 26 includes integrally the inclined inner surface 38 which changes the direction of air flown into the concave portion 26 from the vertically downward direction to the rearward direction and the horizontal inner surface 42 which extends continuously and horizontally from the rear end of the inclined inner surface 38 in the rearward direction. Thus, for example, unlike a case where the bottom wall portion 30 merely includes only the inclined inner surface 38, the direction of the airflow in the concave portion 26 can be changed into a rearward and horizontal direction to the maximum extent possible. Accordingly, there can be more advantageously solved or mitigated the problem in the increase of air resistance caused by a mutual interference between the air released from each outlet hole 24 and the air flowing toward the rear side of the vehicle under the vehicle body.

If the bottom wall portion 30 merely includes only the horizontal bottom portion 40 whose inner face is referred to as the horizontal inner surface 42, there is formed a front side lateral wall portion, which includes an inner side surface comprised of a vertical plane extending from the front side marginal edge of the four marginal edges of the opening portion 28 of the concave portions 26 in the vertically downward direction and also being exposed toward the rear direction. Then, during the traveling of the vehicle, air flown into the concave portions 26 causes a swirling flow (rotational flow). As a result, it can be assumed that a large air resistance may occur in the concave portion 26 or the air flowing on the lower surface side (under the vehicle body) of the base plate 12 may collide with a front side face of the front lateral wall portion extending in the vertically downward direction, thereby causing a large air resistance also on the lower surface side of the base plate 12.

Accordingly, in the leg sweep apparatus 10 according to the present embodiment in which the bottom wall portion 30 is comprised of the inclined bottom portion 36 having the inclined inner surface 38 and the horizontal bottom portion 40 having the horizontal inner surface 42, it is possible to advantageously avoid the foregoing problems which occur when the bottom wall portion 30 is comprised of only the horizontal bottom portion 40 having the horizontal inner surface 42. Therefore, the apparatus 10 can exhibit a function of reducing air resistance more assuredly and stably.

While the preferred embodiment of the present invention has been described in detail, for illustrative purpose only, it is to be understood that the present invention is not limited to the details of the illustrated embodiment.

Figure 5:
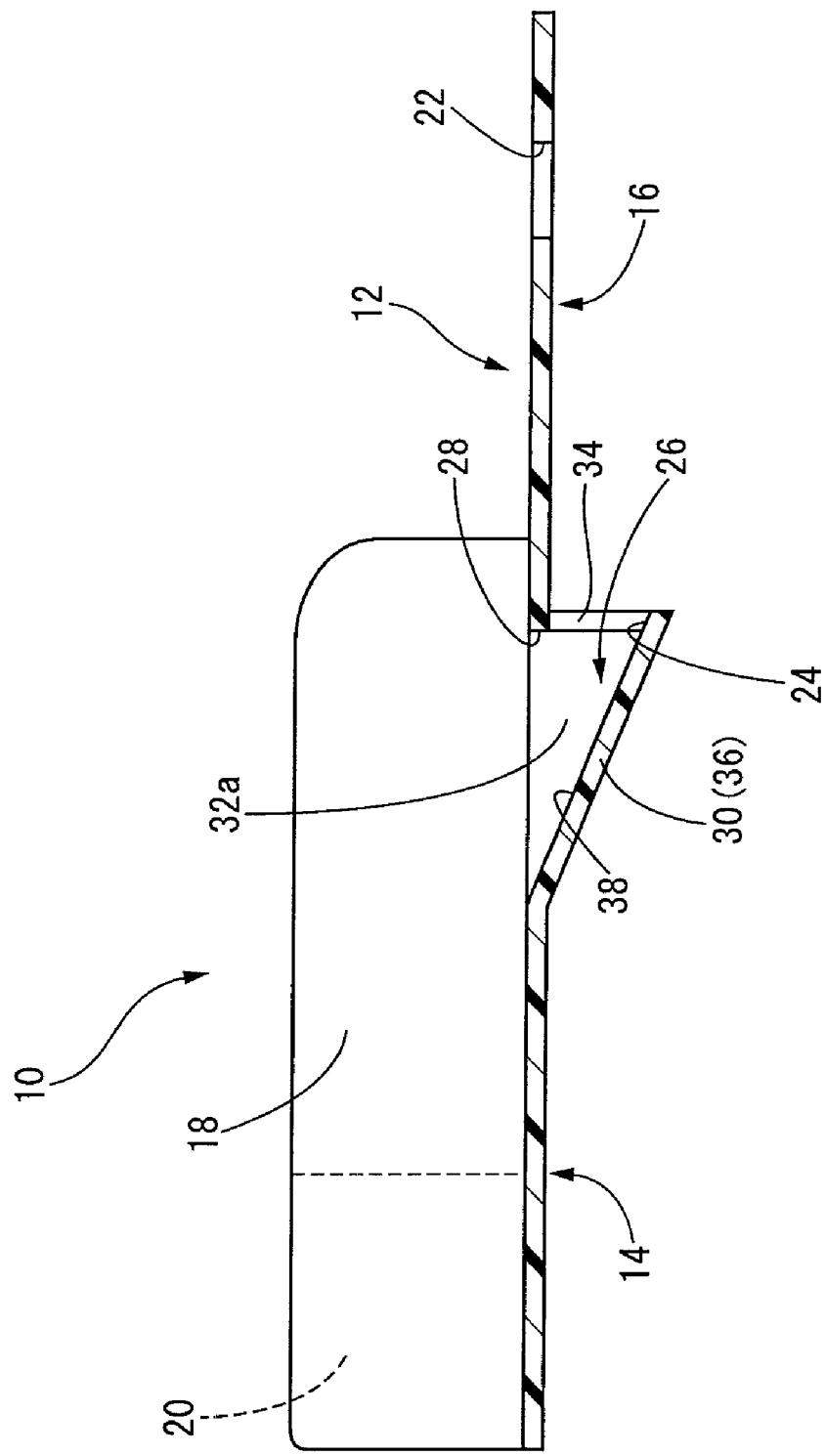
FIG. 5 is a view corresponding to FIG. 2 and showing another example of pedestrian protection apparatus constructed according to a second embodiment of the present invention.

For example, in the above embodiment, the bottom wall portion 30 of the concave portion 26 is comprised of the inclined bottom portion 36 whose inner face is the inclined inner surface 38 and the horizontal bottom portion 40 whose inner face is the horizontal inner surface 42. However, as shown in FIG. 5, the horizontal bottom portion 40 having the horizontal inner surface 42 may be omitted and the entire inner bottom surface portion of the bottom wall portion 30 may be comprised of only the inclined bottom portion 36 whose inner face is referred to as the inclined inner surface 38. Accordingly, while ensuring the effect on suppressing the increase of the air resistance as described above, it is possible to advantageously simplify the structure of the concave portions 26 and simplify the structure of the pedestrian protection apparatus in the form of the leg sweep apparatus 10 as a whole. In the present second embodiment shown in FIG. 5 and a third embodiment shown in FIG. 6 which will be described below, the same reference numerals as used in FIGS. 1 to 4 are used to identify the corresponding components, and a detailed explanation of which is dispensed with.

Figure 6:
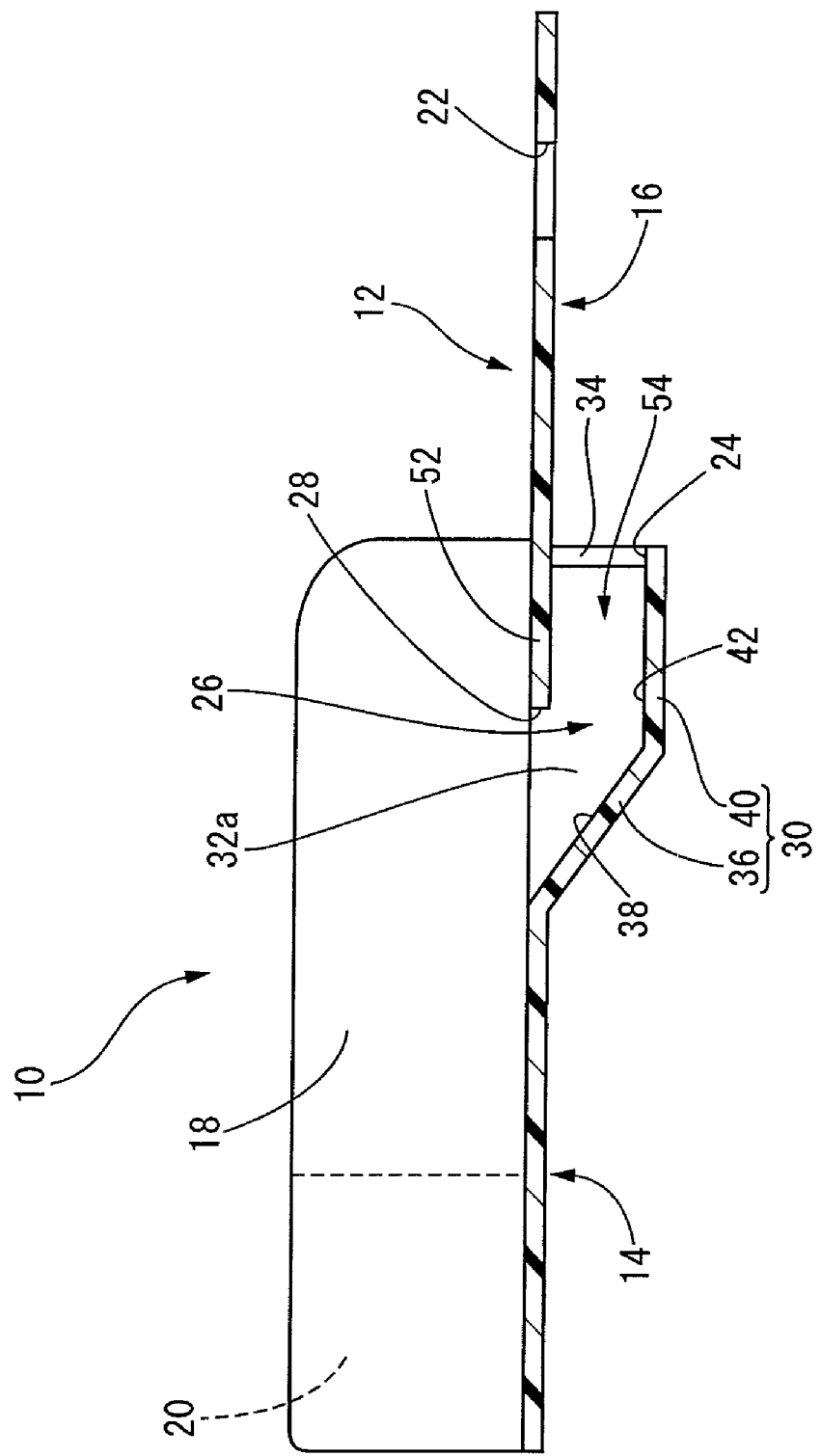
FIG. 6 is a view corresponding to FIG. 2 and showing another example of the pedestrian protection apparatus constructed according to a third embodiment of the present invention.

In addition, as shown in FIG. 6, in the formation region of each concave portion 26 on the frontward region 14 of the base plate 12, there is formed an overlapping portion 52 that extends integrally from the rear side marginal edge of the four marginal edges of the opening portion 28 of the concave portion 26, such that the overlapping portion 52 overlaps the horizontal inner surface 42 of the bottom wall portion 30. Additionally, at the rearward portion positioned between the overlapping portion 52 and the bottom wall portion 30 in the inner space of the concave portion 26, it is also possible to provide a horizontal circulation path 54 formed by being surrounded by a rectangular tubular inner circumferential surface that extends horizontally in the frontward and backward direction and that is comprised of a lower surface of the overlapping portion 52, the horizontal inner surface 42 of the bottom wall portion 30 and opposing surfaces (inner surfaces) of the two longitudinal wall portions 32a, 32b. That is, a part of the rearward portion in the opening portion 28 of the concave portion 26 may be covered by the overlapping portion 52 to provide the horizontal circulation path 54 for communicating with the outside in a rearward through the outlet hole 24 in the concave portion 26.

When such a structure is employed, the direction of the airflow in the concave portion 26 can be changed to a rearward direction and further to a nearly horizontal flow direction. Thus, the structure can eliminate or mitigate the increase of the air resistance due to the mutual interference between air released from each outlet hole 24 and air flowing rearwardly under the vehicle body.

Furthermore, in each of the foregoing three embodiments, the non-horizontal inner surface is comprised of the inclined inner surface 38 inclining downwardly to the rear side of the vehicle body (vehicle). Alternatively, a part or the entire part of the non-horizontal inner surface may be comprised of a curved surface in the form of a convex or in the form of a concave, which extends in a curve such that the depth of the concave portion 26 is gradually increased toward the rear side of the vehicle body. When the non-horizontal inner surface is comprised of the curved or inclined surface, a curvature of the curved surface or an inclination angle of the inclined surface may be determined appropriately depending on the dimension or the like of the concave portion 26.

Additionally, the cross-sectional shape of the concave portion 26 taken along the plane perpendicular to the frontward and backward direction is not particularly limited to the angular U-shape illustrated above, but may be U-shape, V-shape, or may be one of various polygonal shapes, for instance.

Furthermore, the number of the concave portion 26 and the outlet hole 24 formed in the base plate 12 may be either singular or plural, respectively. The number thereof may be suitably changed depending on the dimensions or the like of the base plate 12, the concave portion 26 or the outlet hole 24.

Furthermore, the formation position of the concave portion 26 and the outlet hole 24 in the base plate 12 may be set in a position other than the exemplified position, for example, in the rearward region 16 of the base plate 12, as long as they are positioned more frontward than the radiator 46 in a state in which the base plate 12 is disposed in the vehicle body. Additionally, when the concave portion 26 and the outlet hole 24, respectively, includes a plurality of the concave portions 26 and a plurality of the outlet holes 24, they may be provided dispersedly on both of the frontward region 14 and the rearward region 16 of the base plate 12.

There may be formed a plurality of the outlet holes 24 in one concave portion 26.

In the foregoing embodiments, the outlet hole 24 having the round shape is formed in the lateral wall portion 34 integrally extending from the rear marginal edge of the opening portion 28 of the concave portion 26. However, the outlet hole 24 may have any other shape. Additionally, by omitting the lateral wall portion 34, an entire opening portion of the concave portion 26 to the rear side, which is covered by the lateral wall portion 34, may be served as the outlet hole 24.

The shapes, the positions, the number and the like of the reinforcing ribs 18, 20 formed on the base plate 12 as the plate member are not particularly limited. The reinforcing ribs 18, 20 are not essential in the present invention and may be omitted. Instead of the reinforcing ribs 18 and 20, or in addition to them, a reinforcing bead or the like may be provided on the base plate 12.

It is noted that, the principle of the invention is applicable to any pedestrian protection apparatus such as those installed in various forms in the front face of the vehicles other than the automotive vehicles.

Hereinabove, although the concrete structures of the invention have been described in detail, they are only exemplifications. It is to be understood that the present invention may be embodied with various other changes and modifications which may occur to those skilled in the art, without departing from the spirit and scope of the invention.

What is claimed is:

1. A pedestrian protection apparatus for a vehicle, comprising a plate member which is disposed at a lower part of a front of the vehicle so as to extend in a frontward and backward direction of the vehicle and which is provided with an outlet hole discharging a foreign substance entered an upper surface side of the plate member to the outside in a state in which the plate member is fixed to the vehicle, the apparatus being arranged to sweep a leg portion of a pedestrian that has collided with the front of the vehicle by contact of a front end of the plate member with the leg portion of the pedestrian, thereby protecting the leg portion of the pedestrian, wherein the plate member comprises a concave portion which is open at the upper surface of the plate member and which is formed in the plate member so as to be positioned more frontward of the vehicle than a radiator disposed at the front section of the vehicle in a state in which the plate member is fixed to the vehicle, and wherein the concave portion includes a non-horizontal bottom portion which provides a non-horizontal inner surface extending in an inclined or curved manner such that a depth thereof is gradually increased toward a rear side of the vehicle and the outlet hole formed by a communicating hole which is disposed at the concave portion so as to be positioned more rearward of the vehicle than the non-horizontal bottom portion and which allows a communication between inside and outside of the concave portion.

2. The pedestrian protection apparatus for a vehicle according to claim 1, wherein the concave portion further includes a horizontal bottom portion formed integrally with the non-horizontal bottom portion, the horizontal bottom portion providing a horizontal inner surface extending continuously and horizontally from a rear-side edge of the non-horizontal bottom portion toward the rear of the vehicle, and wherein the outlet hole is disposed at the concave portion so as to be positioned more rearward of the vehicle than the horizontal inner surface provided by the horizontal bottom portion of the concave portion.

3. The pedestrian protection apparatus for a vehicle according to claim 2, wherein the horizontal inner surface provided by the horizontal bottom portion is a surface for changing the direction of the airflow into a rearward and horizontal direction.

4. The pedestrian protection apparatus for a vehicle according to claim 2, wherein the plate member comprises an overlapping portion that overlaps with the horizontal inner surface of the concave portion, and wherein an inner space portion of the concave portion located between the horizontal inner surface and a lower surface of the overlapping portion is surrounded by a tubular inner circumferential surface extending horizontally in the frontward and backward direction of the vehicle.

5. The pedestrian protection apparatus for a vehicle according to claim 1, wherein the concave portion further includes two sidewalls provided downwardly and integrally with a lower surface of the plate member in a state in which the sidewalls extend straightly in the frontward and backward direction of the vehicle.

6. The pedestrian protection apparatus for a vehicle according to claim 5, wherein the concave portion has an angular U-shaped cross-section which is taken along the plane perpendicular to the frontward and backward direction of the vehicle and which is open upward.

7. The pedestrian protection apparatus for a vehicle according to claim 1, wherein a plurality of the outlet holes are provided in the plate member.

* * * * *